United States Patent
Dina et al.

(10) Patent No.: US 8,305,704 B2
(45) Date of Patent: Nov. 6, 2012

(54) WRITE DATA SWITCHING FOR MAGNETIC DISK DRIVES

(75) Inventors: Marius Vicentiu Dina, Inver Grove, MN (US); Jeremy Robert Kuehlwein, Woodburry, MN (US)

(73) Assignee: Texas Instruments Incorporated, Dallas, TX (US)

( * ) Notice: Subject to any disclaimer, the term of this patent is extended or adjusted under 35 U.S.C. 154(b) by 523 days.

(21) Appl. No.: 12/102,106

(22) Filed: Apr. 14, 2008

(65) Prior Publication Data

US 2008/0266696 A1 Oct. 30, 2008

Related U.S. Application Data

(60) Provisional application No. 60/913,165, filed on Apr. 20, 2007.

(51) Int. Cl.
G11B 5/09 (2006.01)
G11B 5/03 (2006.01)

(52) U.S. Cl. ............................................. 360/46; 360/66
(58) Field of Classification Search .................. None
See application file for complete search history.

(56) References Cited

U.S. PATENT DOCUMENTS

| 6,879,455 | B2 * | 4/2005 | Ngo et al. .................... 360/68 |
| 7,035,027 | B2 * | 4/2006 | Barnett et al. ................ 360/46 |
| 7,068,454 | B2 | 6/2006 | Kuehlwein et al. |
| 7,082,004 | B2 | 7/2006 | Kajiyama et al. |
| 7,190,541 | B2 | 3/2007 | Kuehlwein et al. |
| 7,206,155 | B2 | 4/2007 | Kuehlwein et al. |
| 7,239,467 | B2 | 7/2007 | Yoshizawa et al. |
| 7,372,649 | B2 * | 5/2008 | VanEaton et al. ............ 360/46 |
| 2006/0119970 | A1 * | 6/2006 | Hayashi et al. ............... 360/68 |

* cited by examiner

Primary Examiner — Daniell L Negron
(74) Attorney, Agent, or Firm — Lawrence J. Bassuk; W. James Brady; Frederick J. Telecky, Jr.

(57) ABSTRACT

One embodiment of the invention includes a system for writing data onto a magnetic disk. An output driver provides a first write current through a first output transistor in a first state and provides a second write current through a second output transistor in a second state. The first and second write currents can be provided to a disk write head to store opposing binary values, respectively. A bias current generator switches a first bias current between an intermediate voltage node in the second state and the first control node in the first state, and switches a second bias current between the intermediate voltage node in the first state and the second control node in the second state. The first and second bias currents can be provided to set a bias voltage at the first and second control nodes to bias the first and second output transistors, respectively.

5 Claims, 3 Drawing Sheets

WRITE DATA SWITCHING FOR MAGNETIC DISK DRIVES

RELATED APPLICATIONS

The present invention claims priority from U.S. Provisional Patent Application No. 60/913,165, filed Apr. 20, 2007, entitled: "Write Data Switching for Hard Disk Drives".

TECHNICAL FIELD

This invention relates to electronic circuits, and more specifically to write data switching for magnetic disk drives.

BACKGROUND

Most personal computers and computer servers use magnetic disk drive memory storage, such as a hard disk drive. Magnetic disk drives store data based on applying a magnetic field to portions of the disk drive surface to set a magnetic polarity of the portions. The magnetic polarity thus corresponds to the binary data that is stored thereon. The magnetic field is applied based on providing a current through an inductive load that is located in the write head of the disk drive. Current that is provided in one direction through the inductive load provides a magnetic field of a first polarity that can correspond to a binary "1", while current that is provided in the opposite direction through the inductive load provides a magnetic field of a second polarity that can correspond to a binary "0".

SUMMARY

One embodiment of the invention includes a system for writing data onto a magnetic disk. An output driver provides a first write current through a first output transistor in a first state and provides a second write current through a second output transistor in a second state. The first and second write currents can be provided to a disk write head to store opposing binary values, respectively. A bias current generator switches a first bias current between an intermediate voltage node in the second state and the first control node in the first state, and switches a second bias current between the intermediate voltage node in the first state and the second control node in the second state. The first and second bias currents can be provided to set a bias voltage at the first and second control nodes to bias the first and second output transistors, respectively.

Another embodiment of the invention includes a method for writing data onto a magnetic disk. The method comprises activating a first switch in response to a first state of a pulse signal and conducting a current through the first switch at a magnitude that is a sum of a bias current generated from a bias current source and an overshoot current generated from an overshoot current source. The method also comprises setting a magnitude of a bias voltage at a control node to activate an output transistor associated with the control node to generate a write current at a first magnitude. The method further comprises setting a magnitude of a bias voltage at a control node to activate an output transistor to generate a write current at a first magnitude, and deactivating a second switch in response to a first state of an overshoot pulse signal to decouple the overshoot current source from the first switch. The magnitude of the current can be reduced to the magnitude of the bias current, such that the magnitude of the bias voltage changes to generate the write current at a second magnitude that is less than the first magnitude in response to deactivating the second switch.

Another embodiment of the invention includes a magnetic disk write predriver. The predriver comprises means for generating a first bias current and means for generating a first overshoot current. The predriver also comprises means for conducting a first current having a magnitude that is a sum of the first bias current and the first overshoot current to set a first bias voltage at a first control node upon a transition from a first state to a second state. The first control node can be coupled to an output transistor that is activated by the first bias voltage to control a magnitude of a write current through the output transistor. The first and second states correspond to opposing binary write values, respectively. The predriver further comprises means for deactivating the first overshoot current during the second state to set the magnitude of the first current to be approximately equal to the first bias current.

DETAILED DESCRIPTION

This invention relates to electronic circuits, and more specifically to write data switching for magnetic disk drives. A disk write predriver includes a bias current generator and an overshoot current generator. The bias current generator includes transistors that are coupled to each of two control nodes, with each of the two control nodes being respectively coupled to each of two output transistors in an output driver. The bias current generator receives a pulse signal that controls a set of the transistors to switch a current source between one of the control nodes and an intermediate voltage node in response to opposing binary states of the pulse signal. The current provided by the current source sets a bias voltage at the one control node to activate the respective output transistor in the output driver to generate an output current that becomes the write current through a write head to write data onto a magnetic disk. Thus, the bias voltage is set for each of the control nodes at opposite binary states of the pulse signal to activate the respective output transistor for the generation of the write current in each respective current flow direction through the write head.

The overshoot current generator is coupled to the bias current generator. The overshoot current generator includes transistors that are coupled to each transistor in the bias current generator that is coupled to the respective one of the control nodes. The bias current generator receives an overshoot pulse signal that is a delayed version of the pulse signal. The overshoot pulse signal controls a set of the transistors to switch an overshoot current source between the respective one of the transistors in the bias current generator and the intermediate voltage node in response to opposing binary states of the overshoot pulse signal. The current provided by the overshoot current source contributes to the bias voltage at the one control node to increase the output current through the output transistor, thus increasing the write current during an overshoot phase that is defined by the amount of delay between the pulse signal and the overshoot pulse signal. Thus, upon expiration of the overshoot phase, the overshoot current generator switches the overshoot current source to the intermediate voltage node.

Figure 1:
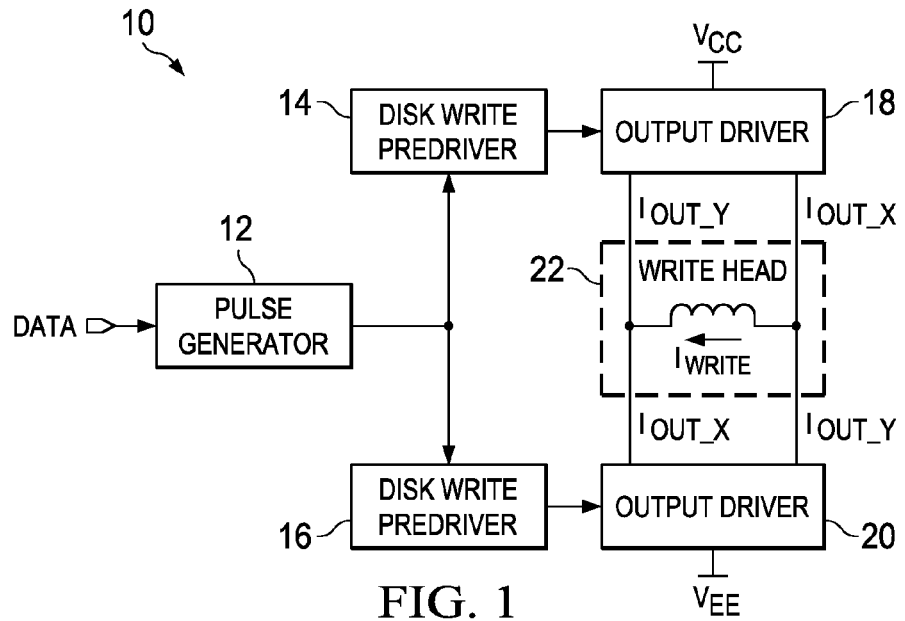
FIG. 1 illustrates an example of a magnetic disk write system in accordance with an aspect of the invention.

FIG. 1 illustrates an example of a magnetic disk write system 10 in accordance with an aspect of the invention. The system 10 includes a pulse generator 12 that receives a signal DATA as an input. The signal DATA can be, for example, a stream of data that is to be written to the magnetic disk (not shown). The pulse generator 12 generates a plurality of signals to control a write operation of the signal DATA onto the magnetic disk and provides the signals to a first disk write predriver 14 and a second disk write predriver 16. The first and second disk write predrivers 14 and 16 are configured to generate bias signals corresponding to the signal DATA and provide the bias signals to a first output driver 18 and a second output driver 20, respectively.

The first and second output drivers 18 and 20 generate output currents $I_{OUT\_X}$ and $I_{OUT\_Y}$ through the write head 22 from a positive rail voltage $V_{CC}$ to a negative rail voltage $V_{EE}$. Specifically, the first output driver 18 can source the output current $I_{OUT\_X}$ from the positive rail voltage $V_{CC}$ and the second output driver 20 can sink the output current $I_{OUT\_X}$ to the negative rail voltage $V_{EE}$, such that the output current $I_{OUT\_X}$ flows through the write head 22 as a write current $I_{WRITE}$, as demonstrated in the example of FIG. 1. The write current $I_{WRITE}$ thus generates a magnetic field through the inductive load in the write head 22 corresponding to a first binary state of data that is written to the magnetic disk. Alternatively, the first output driver 18 can source the output current $I_{OUT\_Y}$ from the positive rail voltage $V_{CC}$ and the second output driver 20 can sink the output current $I_{OUT\_Y}$ to the negative rail voltage $V_{EE}$, such that the output current $I_{OUT\_Y}$ flows through the write head 22 as the write current $I_{WRITE}$ in the opposite direction. Therefore, the write current $I_{WRITE}$ generates a magnetic field through the inductive load in the write head 22 in the opposite direction corresponding to the opposite binary state of data that is written to the magnetic disk.

As an example, the first and second disk write predrivers 14 and 16 can each include a bias current generator and an overshoot current generator. The bias current generator of each of the first and second disk write predrivers 14 and 16 includes switches that are coupled to each of two control nodes that correspond, respectively, to output transistors in the respective output drivers 18 and 20 that control activation of the output currents $I_{OUT\_X}$ and $I_{OUT\_Y}$. As an example, the switches in the first and second disk write predrivers 14 and 16 can actively control the output transistors in the respective output drivers 18 and 20, such that the switches in the first and second disk write predrivers 14 and 16 are activated to source or sink current, respectively, to control nodes that bias the output transistors in the respective output drivers 18 and 20. The switches in the first and second disk write predrivers 14 and 16 can be controlled based on a pulse signal that is generated from the pulse generator 12.

The overshoot current generator in the first and second disk write predrivers 14 and 16 can be configured to add an overshoot current to the bias currents that flow through the switches in the bias current generators during an overshoot phase. Specifically, because the write current $I_{WRITE}$ is provided through an inductive load, the absolute magnitude of the write current $I_{WRITE}$ is increased upon switching logic-states of the data that is written to the magnetic disk (i.e., direction of the flow of the write current $I_{WRITE}$) to overcome the inductance of the of the inductive load. The addition of the overshoot current through the switches in the bias current generator that provide the bias current can thus reduce parasitic capacitance associated with the control nodes to provide for more rapid switching. In addition, the overshoot transistors can be controlled based on an overshoot pulse signal that is a time-delayed version of the pulse signal that controls the switches in the bias current generator. As a result, the overshoot current does not need to be time-aligned with the beginning of a logic-state transition of the pulse signal that controls the switches in the bias current generator, as the overshoot phase can merely be defined as the time delay difference pulse signal and the overshoot pulse signal.

Figure 2:
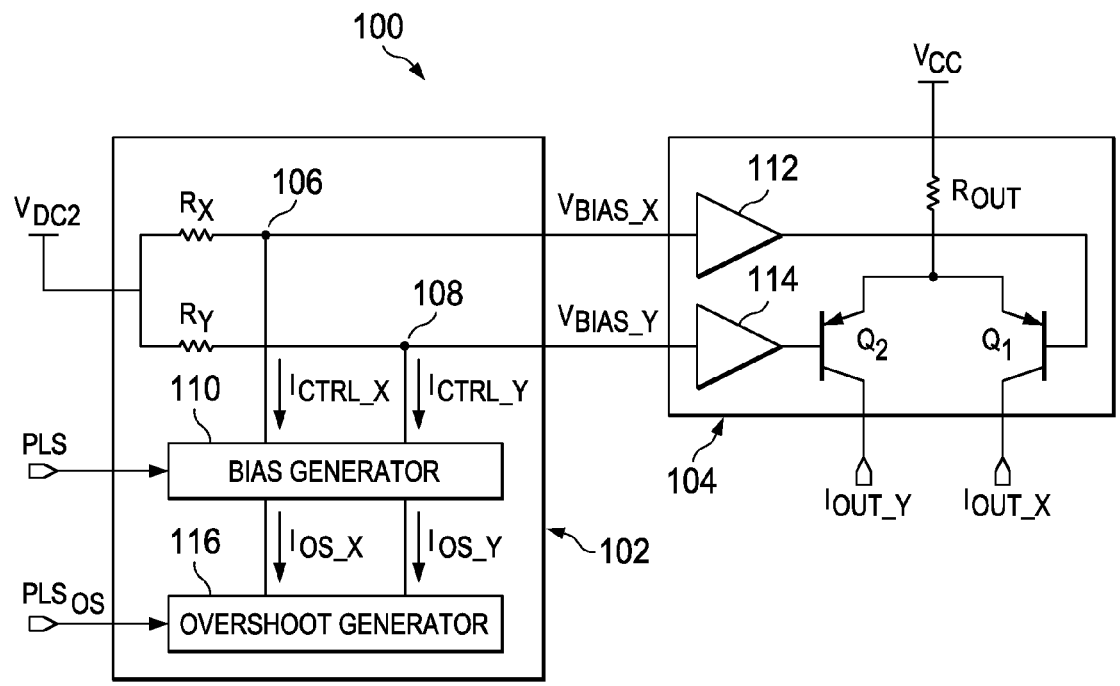
FIG. 2 illustrates an example of a magnetic disk write driver system in accordance with an aspect of the invention.

FIG. 2 illustrates an example of a magnetic disk write driver system 100 in accordance with an aspect of the invention. The system 100 includes a disk write predriver 102 and an output driver 104. As an example, the disk write predriver 102 and the output driver 104 can correspond to the first disk write predriver 14 and the first output driver 18, respectively. Therefore, reference is to be made to the example of FIG. 1 in the following discussion of the example of FIG. 2.

The disk write predriver 102 receives a control voltage $V_{DC2}$ that sets a first bias voltage $V_{BIAS\_X}$ across a resistor $R_X$ at a first control node 106 and a second bias voltage $V_{BIAS\_Y}$ across a resistor $R_Y$ at a second control node 108. The control voltage $V_{DC2}$ can have a magnitude, for example, that is sufficient to keep a first output transistor $Q_1$ and a second output transistor $Q_2$ that are included in the output driver 104 deactivated, as described in greater detail below. As also demonstrated below, the relative magnitude of the first and second bias voltages $V_{BIAS\_X}$ and $V_{BIAS\_Y}$ are determinative of a direction of the write current $I_{WRITE}$ through the write head 22, and thus the binary logic state of the write data based on the polarity of the associated magnetic field.

The disk write predriver 102 includes a bias current generator 110. The bias current generator 110 is configured to receive a pulse signal PLS, such as generated from the pulse generator 12 in the example of FIG. 1. Thus, the pulse signal PLS can be a binary signal that corresponds to the write data that is to be stored on the magnetic disk. The bias current generator 110 is thus configured to generate a first bias current and a second bias current in response to the binary state of the pulse signal PLS. In the example of FIG. 2, the bias currents are demonstrated as a first current $I_{CTRL\_X}$ and a second current $I_{CTRL\_Y}$. As an example, the first and second currents $I_{CTRL\_X}$ and $I_{CTRL\_Y}$ can be provided through transistors, such as being activated by opposing binary states of the pulse signal PLS. As such, the first and second currents $I_{CTRL\_X}$ and $I_{CTRL\_Y}$ can have a magnitude that is sufficient to adjust the respective magnitudes of the bias voltages $V_{BIAS\_X}$ and $V_{BIAS\_Y}$, such as to decrease the respective one of the bias voltages $V_{BIAS\_X}$ and $V_{BIAS\_Y}$ by a magnitude sufficient to activate respective output transistors (e.g., approximately 300 mV). As an example, the bias current generator 110 can generate the first and second currents $I_{CTRL\_X}$ and $I_{CTRL\_Y}$ mutually exclusively, such that the bias current generator 110 can provide the first current $I_{CTRL\_X}$ to decrease the first bias voltage $V_{BIAS\_X}$ or can provide the second current $I_{CTRL\_Y}$ to decrease the second bias voltage $V_{BIAS\_Y}$.

The output driver 104 includes a first driver 112 and a second driver 114. The first driver 112 interconnects the first control node 106 and a base of a first switch $Q_1$, demonstrated in the example of FIG. 2 as a PNP-type bipolar junction transistor (BJT). Similarly, the second driver 114 interconnects the second control node 108 and a base of a second switch $Q_2$. The first and second drivers 112 and 114 are configured to set the appropriate bias levels for switching the first and second switches $Q_1$ and $Q_2$, such as in a linear mode of operation, based on the respective first and second bias voltages $V_{BIAS\_X}$ and $V_{BIAS\_Y}$.

In response to the bias current generator 110 providing the first current $I_{CTRL\_X}$, the first bias voltage $V_{BIAS\_X}$ is decreased. Thus, the first switch $Q_1$ is activated based on a logic-low state output from the first driver 112 to generate the first output current $I_{OUT\_X}$ via the positive rail voltage $V_{CC}$ and a resistor $R_{OUT}$ to provide the write current $I_{WRITE}$ in a first direction through the write head 22. Likewise, in response to the bias current generator 110 generating the second current $I_{CTRL\_Y}$, the second bias voltage $V_{BIAS\_Y}$ is decreased. Thus, the second switch $Q_2$ is activated based on a logic-low state output from the second driver 114 to generate the second output current $I_{OUT\_Y}$ to provide the write current $I_{WRITE}$ in the opposite direction through the write head 22. Accordingly, the bias current generator 110 provides the first current $I_{CTRL\_X}$ to decrease the first bias voltage $V_{BIAS\_X}$ to activate the first switch $Q_1$ and provides the second current $I_{CTRL\_Y}$ to decrease the second bias voltage $V_{BIAS\_Y}$ to activate the second switch $Q_2$.

As described above in the example of FIG. 1, the write head 22 includes an inductive load. As a result, the write head 22 can be slow to react to changes in the write current $I_{WRITE}$ in generating the magnetic field to write data onto the magnetic disk based on the low pass filter characteristic of inductive loads. Therefore, the disk write predriver 102 also includes an overshoot current generator 116 configured to generate a first overshoot current $I_{OS\_X}$ and a second overshoot current $I_{OS\_Y}$. The first and second overshoot currents $I_{OS\_X}$ and $I_{OS\_Y}$ are generated, respectively, based on opposite states of an overshoot pulse signal $PLS_{OS}$. As an example, the overshoot pulse signal $PLS_{OS}$ can be a delayed version of the pulse signal PLS, such as generated by the pulse generator 12 in the example of FIG. 1. Thus, an overshoot phase can be defined based on the amount of delay between the pulse signal PLS and the overshoot pulse signal $PLS_{OS}$.

In the example of FIG. 2, the bias current generator 110 interconnects the overshoot current generator 116 and the first and second control nodes 106 and 108. Therefore, during an overshoot phase, the first and second overshoot currents $I_{OS\_X}$ and $I_{OS\_Y}$ can flow through transistors in both the overshoot current generator 116, such as based on being activated by the respective opposite binary states of the overshoot pulse signal $PLS_{OS}$, and through the transistors in the bias current generator 110. Accordingly, during an overshoot phase, the first current $I_{CTRL\_X}$ or the second current $I_{CTRL\_Y}$ can have a magnitude that includes both a bias current, as generated by the bias current generator 110, and the respective overshoot current $I_{OS\_X}$ or $I_{OS\_Y}$. The addition of the first and second overshoot currents $I_{OS\_X}$ and $I_{OS\_Y}$ to the bias currents in the respective currents $I_{CTRL\_X}$ and $I_{CTRL\_Y}$ can thus operate to increase the magnitude of the respective output currents $I_{OUT\_X}$ and $I_{OUT\_Y}$ during an overshoot phase, such as at a binary state transition of the pulse signal PLS.

Based on the magnitude of the control voltage $V_{DC2}$ being sufficient to hold the first and second switches $Q_1$ and $Q_2$ in a deactivated state, the example of FIG. 2 demonstrates that the currents $I_{CTRL\_X}$ and $I_{CTRL\_Y}$ are generated, respectively, to activate the switches $Q_1$ and $Q_2$ by decreasing the magnitudes of the respective first and second bias voltages $V_{BIAS\_X}$ and $V_{BIAS\_Y}$. Therefore, the magnetic disk write driver system 100 exhibits active switching in generating the write current $I_{WRITE}$ by activating the first and second currents $I_{CTRL\_X}$ and $I_{CTRL\_Y}$ to activate the respective first and second switches $Q_1$ and $Q_2$ as opposed to passive switching, such as by deactivating the first and second currents $I_{BIAS\_X}$ and $I_{BIAS\_Y}$ to activate the respective second and first switches $Q_2$ and $Q_1$. As a result, the magnetic disk write driver system 100 does not experience transistor deactivation delays to delay activation of the switches $Q_1$ and $Q_2$, such as could result from passive switching of the first and second switches $Q_1$ and $Q_2$.

In addition, as described above, the first and second currents $I_{CTRL\_X}$ and $I_{CTRL\_Y}$ can be composite currents during an overshoot phase that includes both a bias current and an overshoot current. As such, the first and second currents $I_{CTRL\_X}$ and $I_{CTRL\_Y}$ can each be generated to flow through a single transistor. Therefore, parasitic capacitance associated with the first and second control nodes 106 and 108 can be mitigated, such that the first and second bias voltages $V_{BIAS\_X}$ and $V_{BIAS\_Y}$ can adjust magnitudes more quickly. As a result, the first and second switches $Q_1$ and $Q_2$ can experience faster switching times.

Furthermore, timing problems associated with the switching of the first and second overshoot currents $I_{OS\_X}$ and $I_{OS\_Y}$ can be mitigated. Specifically, an overshoot phase could be substantially short (e.g., 100 picoseconds), such that it could be shorter than a width of a write data bit to minimize slew of the write current $I_{WRITE}$ from one polarity to another at a write data binary state transition. Individual control of the first and second overshoot currents $I_{OS\_X}$ and $I_{OS\_Y}$, such as in response to individual overshoot signal pulses that could define the overshoot phase at each polarity transition of the write current $I_{WRITE}$, could result in timing problems in propagating individual overshoot pulse signals through the system 10 to align the individual overshoot pulse signals with respective transitions of the pulse signal PLS. However, based on the overshoot pulse signal $PLS_{OS}$ being a single signal that is a time delayed version of the pulse signal PLS, timing problems in generating the first and second overshoot currents $I_{OS\_X}$ and $I_{OS\_Y}$ can be substantially mitigated.

Figure 3:
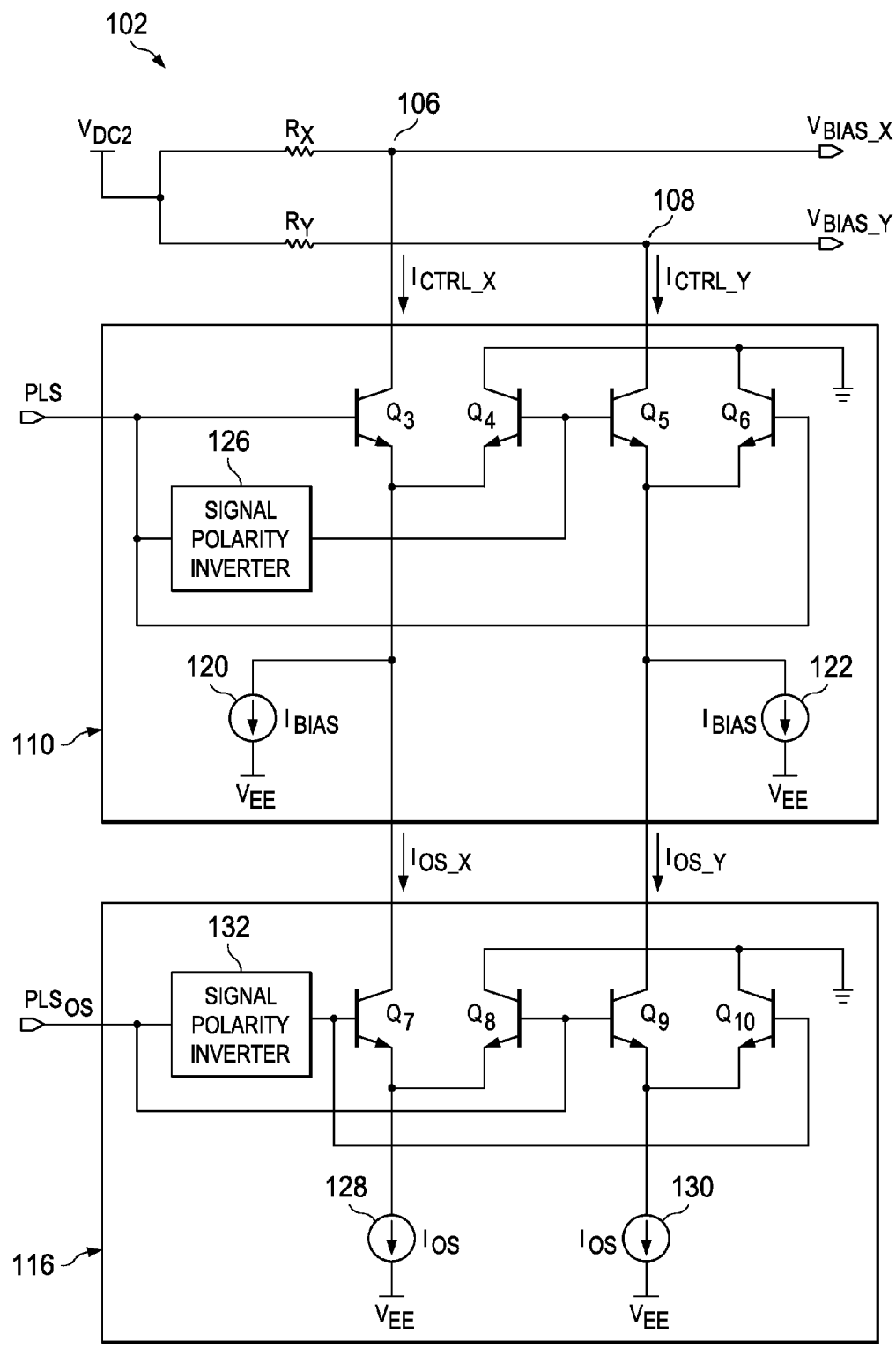
FIG. 3 illustrates an example of a disk write predriver in accordance with an aspect of the invention.

FIG. 3 illustrates an example of the disk write predriver 102 in accordance with an aspect of the invention. As demonstrated in the example of FIG. 3, the disk write predriver 102 includes the bias current generator 110 and the overshoot current generator 116. The bias current generator 110 includes two pairs of switches, a switch $Q_3$ and a switch $Q_4$ as well as a switch $Q_5$ and a switch $Q_6$. The switches $Q_3$ through $Q_6$ are all demonstrated in the example of FIG. 3 as NPN BJTs, but can instead implement PNP BJTs or field effect transistors (FETs). However, it is to be understood that the bias current generator 110 is not limited to the use of NPN BJTs. The switch $Q_3$ interconnects the first control node 106 at a collector and a first bias current source 120 at an emitter. Similarly, the switch $Q_5$ interconnects the second control node 108 at a collector and a second bias current source 122 at an emitter. As demonstrated in the example of FIG. 3, the first and second bias current sources 120 and 122 generate a current having a magnitude of $I_{BIAS}$ to a negative voltage rail $V_{EE}$, which could be negative relative to ground. The switches $Q_4$ and $Q_6$ interconnect a common mode control node, demonstrated in the example of FIG. 3 as ground, and the respective first and second bias current sources 120 and 122. The switches $Q_3$ and $Q_6$ have bases that are coupled directly to the pulse signal PLS, while the switches $Q_4$ and $Q_5$ have bases that are coupled to the pulse signal PLS via a signal polarity inverter 126 configured to provide a signal that is a substantially opposite polarity signal as the pulse signal PLS. It is to be understood that, although the pulse signal PLS is demonstrated and discussed as appearing digital, it can be an analog signal.

The overshoot current generator 116 includes two pairs of switches, a switch $Q_7$ and a switch $Q_8$ as well as a switch $Q_9$ and a switch $Q_{10}$. Similar to the bias current generator 110, the switches $Q_7$ through $Q_{10}$ are all demonstrated in the example of FIG. 3 as NPN BJTs. The switch $Q_7$ interconnects the emitter of the switch $Q_3$ at a collector and a first overshoot current source 128 at an emitter. Similarly, the switch $Q_{10}$ interconnects the emitter of the switch $Q_5$ at a collector and a second overshoot current source 130 at an emitter. As demonstrated in the example of FIG. 3, the first and second overshoot current sources 128 and 130 generate a current having a magnitude of $I_{OS}$ to the negative voltage rail $V_{EE}$. The switches $Q_8$ and $Q_{10}$ interconnect ground and the respective first and second overshoot current sources 128 and 130. The switches $Q_8$ and $Q_9$ have bases that are coupled directly to the overshoot pulse signal $PLS_{OS}$, while the switches $Q_7$ and $Q_{10}$ have bases that are coupled to the overshoot pulse signal $PLS_{OS}$ via a signal polarity inverter 132 configured to provide a signal that is a substantially opposite polarity signal as the overshoot pulse signal $PLS_{OS}$. It is to be understood that, although the overshoot pulse signal $PLS_{OS}$ is demonstrated and discussed as appearing digital, it can be an analog signal.

Figure 4:
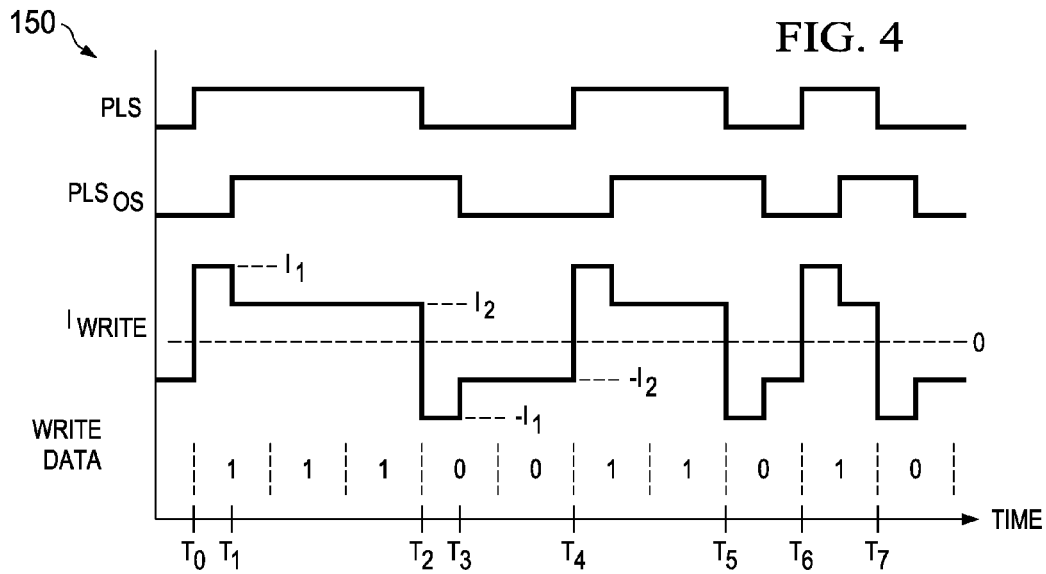
FIG. 4 illustrates an example of a timing diagram associated with a magnetic disk write driver system in accordance with an aspect of the invention.

FIG. 4 illustrates an example of a timing diagram 150 associated with the magnetic disk write driver system 100. It is to be understood that the timing diagram 150 is demonstrated in the example of FIG. 4 as an ideal timing diagram, such that inherent signal delays and minor magnitude variations are not illustrated. At a time $T_0$, the pulse signal PLS switches from a logic-low (i.e., binary "0") state to a logic-high (i.e., binary "1") state. In response, the switches $Q_4$ and $Q_5$ are deactivated and the switches $Q_3$ and $Q_6$ are activated. Therefore, the switch $Q_3$ couples the first control node 106 to the first bias current source 120 and the switch $Q_6$ couples the second bias current source 122 to ground.

In addition, at a time prior to the time $T_0$, the overshoot pulse signal $PLS_{OS}$ is switched logic-low, and thus remains logic-low at the time $T_0$. Therefore, the switches $Q_8$ and $Q_9$ have been deactivated and the switches $Q_7$ and $Q_{10}$ have been activated. Thus, just prior to the time $T_0$, the switch $Q_4$ and the switch $Q_7$ were each activated, such that the switch $Q_4$ conducted a composite current from ground having a magnitude that is a sum of $I_{OS}$ (i.e., the first overshoot current $I_{OS\_X}$) and $I_{BIAS}$, and the switch $Q_7$ conducted the current $I_{OS\_X}$ having a magnitude of $I_{OS}$. However, at the time $T_0$, upon deactivation of the switch $Q_4$ and activation of the switch $Q_3$, the switch $Q_3$ now conducts the composite current $I_{CTRL\_X}$, having the magnitude that is the sum of $I_{BIAS}$ and $I_{OS}$, from the first control node 106. The switch $Q_7$ continues to conduct the current $I_{OS\_X}$ at the time $T_0$. Also at the time $T_0$, the switch $Q_6$ conducts a composite current from ground having a magnitude that is a sum of $I_{OS}$ (i.e., the second overshoot current $I_{OS\_Y}$) and $I_{BIAS}$, and the switch $Q_9$ conducts the second overshoot current $I_{OS\_Y}$ having a magnitude of $I_{OS}$.

In response to the first current $I_{CTRL\_X}$, the first bias voltage $V_{BIAS\_X}$ decreases to activate the first switch $Q_1$, resulting in the generation of the output current $I_{OUT\_X}$. Due to the inclusion of the first overshoot current $I_{OS\_X}$ in the first current $I_{CTRL\_X}$, the time $T_0$ marks the beginning of an overshoot phase based on the binary state transition of the pulse signal PLS. Thus, the write current $I_{WRITE}$ is demonstrated at the time $T_0$ as having a positive overshoot magnitude of $I_1$, such that the write head 22 writes a binary "1" to the magnetic disk. It is to be understood that the write current $I_{WRITE}$ has a positive value, relative to 0 amps as demonstrated in the timing diagram 150, based on the direction of the write current $I_{WRITE}$ through the write head 22 as demonstrated in the example of FIG. 1.

As described above, the overshoot pulse signal $PLS_{OS}$ can be configured as a delayed version of the pulse signal PLS. At a time $T_1$, the overshoot pulse signal $PLS_{OS}$ is asserted, thus ending the overshoot phase. Accordingly, in the example of FIG. 4, the overshoot phase has a duration that is defined by the amount of delay between the pulse signal PLS and the overshoot pulse signal $PLS_{OS}$ (i.e., from $T_0$ $T_1$). In response to the assertion of the overshoot pulse signal $PLS_{OS}$ at the time $T_1$, the switches $Q_7$ and $Q_{10}$ are deactivated and the switches $Q_8$ and $Q_9$ are activated. Therefore, the first overshoot current $I_{OS\_X}$ no longer flows through the switch $Q_3$. As a result, the current $I_{CTRL\_X}$ is reduced to a magnitude of $I_{BIAS}$ based on the switch $Q_3$ only conducting the current that is generated from the first bias current source 120. Accordingly, the first bias voltage $V_{BIAS\_X}$ increases, resulting in a decrease of the magnitude of the output current $I_{OUT\_X}$, and thus a decrease of the write current $I_{WRITE}$ to a magnitude of $I_2$.

Also at the time $T_1$, because the switch $Q_8$ is activated, the overshoot current $I_{OS}$ generated from the first overshoot current source 128 flows from ground to the negative rail voltage $V_{EE}$ through the switch $Q_8$. In addition, because the switch $Q_8$ is activated, the switch $Q_9$ conducts the second overshoot current $I_{OS\_Y}$ with an approximate magnitude of $I_{OS}$ as generated by the second overshoot current source 130. The switch $Q_6$, which was activated at the time $T_0$, now conducts a composite current from ground having a magnitude that is a sum of the bias current $I_{BIAS}$ generated from the second bias current source 122 and the second overshoot current $I_{OS\_Y}$.

At a time $T_2$, the pulse signal PLS is deasserted, thus switching from a logic-high state to a logic-low state. As demonstrated in the example of FIG. 3, the length of the assertion of the pulse signal from the time $T_0$ the time $T_2$ was sufficient for the magnetic field generated by the write current $I_{WRITE}$ flowing through the write head 22 to write three consecutive logic "1" values to the magnetic disk. However, at the time $T_2$, because the pulse signal PLS is deasserted, the next bit to be written to the magnetic disk is a logic "0".

In response to the deassertion of the pulse signal PLS, the switches $Q_3$ and $Q_6$ are deactivated and the switches $Q_4$ and $Q_5$ are activated. Therefore, the switch $Q_5$ couples the second control node 108 to the second bias current source 122 and the switch $Q_4$ couples the first bias current source 120 to ground. However, the switch $Q_9$ was activated at the time $T_1$ and remains activated at the time $T_2$, thus continuing to conduct the second overshoot current $I_{OS\_Y}$ at the time $T_2$. Therefore, at the time $T_2$, the switch $Q_5$ now conducts the composite current $I_{CTRL\_Y}$, having the magnitude that is the sum of $I_{OS}$ (i.e., the second overshoot current $I_{OS\_Y}$) and $I_{BIAS}$, from the second control node 108. Thus, the write current $I_{WRITE}$ is demonstrated at the time $T_2$ as having a negative overshoot magnitude of $-I_1$, such that the write head 22 writes the binary "0" to the magnetic disk. Specifically, because the write current $I_{WRITE}$ flows through an inductive load, the overshoot magnitude $-I_1$ is effective to reverse the magnetic field generated by the write head 22 more rapidly for a stable transition of writing a binary "1" to a binary "0" consecutively. Also at the time $T_2$, the switch $Q_4$ conducts a composite current from ground having a magnitude that is a sum of $I_{OS}$ (i.e., the first overshoot current $I_{OS\_X}$) and $I_{BIAS}$, and the switch $Q_7$ conducts the second overshoot current $I_{OS\_Y}$ having a magnitude of $I_{OS}$.

At a time $T_3$, the overshoot pulse signal $PLS_{OS}$ is deasserted, thus ending the overshoot phase. In response, the switches $Q_8$ and $Q_9$ are deactivated and the switches $Q_7$ and $Q_{10}$ are activated. Therefore, the second overshoot current $I_{OS\_Y}$ no longer flows through the switch $Q_5$. As a result, the current $I_{CTRL\_Y}$ is reduced to a magnitude of $I_{BIAS}$ based on the switch $Q_5$ only conducting the current that is generated from the second bias current source 122. Accordingly, the second bias voltage $V_{BIAS\_Y}$ increases, resulting in a decrease of the magnitude of the output current $I_{OUT\_Y}$, and thus an increase (i.e., absolute magnitude decrease) of the write current $I_{WRITE}$ to a magnitude of $-I_2$.

Also at the time $T_3$, because the switch $Q_{10}$ is activated, the overshoot current $I_{OS}$ generated from the second overshoot current source 130 flows from ground to the negative rail voltage $V_{EE}$ through the switch $Q_{10}$. In addition, because the switch $Q_7$ is activated, the switch $Q_7$ conducts the first overshoot current $I_{OS\_X}$ with an approximate magnitude of $I_{OS}$ as generated by the first overshoot current source 128. The switch $Q_4$, which was activated at the time $T_2$, now conducts a composite current from ground having a magnitude that is a sum of the bias current $I_{BIAS}$ generated from the first bias current source 120 and the first overshoot current $I_{OS\_X}$.

At a time $T_4$, another logic transition of the pulse signal PLS occurs from logic-low to logic-high. Accordingly, the magnetic disk write driver system 100 operates similar to as described above at the time $T_0$. As demonstrated in the example of FIG. 4, the duration of the logic-low pulse of the pulse signal PLS from the time $T_2$ to the time $T_4$ was sufficient for the magnetic field generated by the write current $I_{WRITE}$ flowing through the write head 22 to write two consecutive logic "0" values to the magnetic disk. At time $T_5$, after two consecutive logic "1" values have been written to the magnetic disk, another logic transition of the pulse signal PLS occurs from logic-high to logic-low, thus repeating the operation as described above at the time $T_2$. Further single-bit transitions occur at subsequent times $T_6$ and $T_7$.

Based on the examples of FIGS. 1-4, it is demonstrated that substantially high data-rates can be achieved, such as 4 gigabits per second (i.e., 1 bit every 250 picoseconds). Such high data-rates or greater can be achieved based on, for example, active switching in generating the write current $I_{WRITE}$ by activating the first and second currents $I_{CTRL\_X}$ and $I_{CTRL\_Y}$ to activate the respective first and second switches $Q_1$ and $Q_2$, as opposed to passive switching. As a result, the magnetic disk write driver system 100 does not experience transistor deactivation delays to delay activation of the switches $Q_1$ and $Q_2$. In addition, the substantially higher data-rates can also be achieved, for example, based on mitigating parasitic capacitance associated with each of the first and second control nodes 106 and 108, such as based on the coupling of only a single switch, $Q_3$ and $Q_5$, respectively, as demonstrated in the example of FIG. 3. Thus, the first and second switches $Q_1$ and $Q_2$ can be switched faster based on more rapid changes that can be realized in the first and second bias voltages $V_{BIAS\_X}$ and $V_{BIAS\_Y}$. Furthermore, timing problems associated with aligning the first and second overshoot currents $I_{OS\_X}$ and $I_{OS\_Y}$ with respective transitions of the pulse signal PLS, such as based on individual control of the first and second overshoot currents $I_{OS\_X}$ and $I_{OS\_Y}$, can be mitigated based on configuring the overshoot pulse signal $PLS_{OS}$ as a single signal that is a time delayed version of the pulse signal PLS.

It is to be understood that the magnetic disk write driver system 100 is not intended to be limited to the example of FIGS. 2 and 3. Specifically, as described above, the disk write predriver 102 and the output driver 104 can be configured as the first disk write predriver 14 and the first output driver 18, respectively, in the example of FIG. 1. Therefore, a disk write predriver and an output driver that are configured substantially similar to the disk write predriver 102 and the output driver 104 can be configured as the second disk write predriver 16 and the second output driver 20, such that the substantially similar disk write predriver and output driver can be configured as substantial mirror-images of the disk write predriver 102 and the output driver 104. Specifically, the substantially similar disk write predriver can be configured with PNP BJTs, such that currents $I_{CTRL\_X}$ and $I_{CTRL\_Y}$ can be sourced to respective first and second control nodes from the positive rail voltage $V_{CC}$. Likewise, the substantially similar output driver can be configured with NPN BJTs that sink the write current $I_{WRITE}$ from the write head 22 to the negative voltage rail $V_{EE}$ in response to respective increased magnitudes of the bias voltages $V_{BIAS\_X}$ and $V_{BIAS\_Y}$ on the mirror-image control nodes.

In addition, it is to be understood that the pulse signal PLS and the overshoot pulse signal $PLS_{OS}$ need not be limited to single-ended signals, but can also be implemented as differential signals. As such, the signal polarity inverters 126 and 132 can be obviated, as the opposite signal of the respective differential pulse signal pair PLS and overshoot pulse signal pair $PLS_{OS}$ can be implemented to control the switches $Q_4$ and $Q_5$ and switches $Q_7$ and $Q_{10}$, respectively. Also, the bias current generator 110 and the overshoot current generator 116 are not limited to the example of FIG. 3. Furthermore, the generation of the currents $I_{CTRL\_X}$ and $I_{CTRL\_Y}$ is not limited to the switching arrangements of the switches $Q_3$ through $Q_6$ and the switches $Q_7$ through $Q_{10}$. Specifically, any of a variety of configurations of switches can be implemented to generate the currents $I_{CTRL\_X}$ and $I_{CTRL\_Y}$ having a magnitude of $I_{BIAS}$ and a magnitude of $I_{BIAS}$ plus $I_{OS}$ during an overshoot phase. Accordingly, the magnetic disk write driver system 100 can be implemented in any of a variety of ways.

Figure 5:
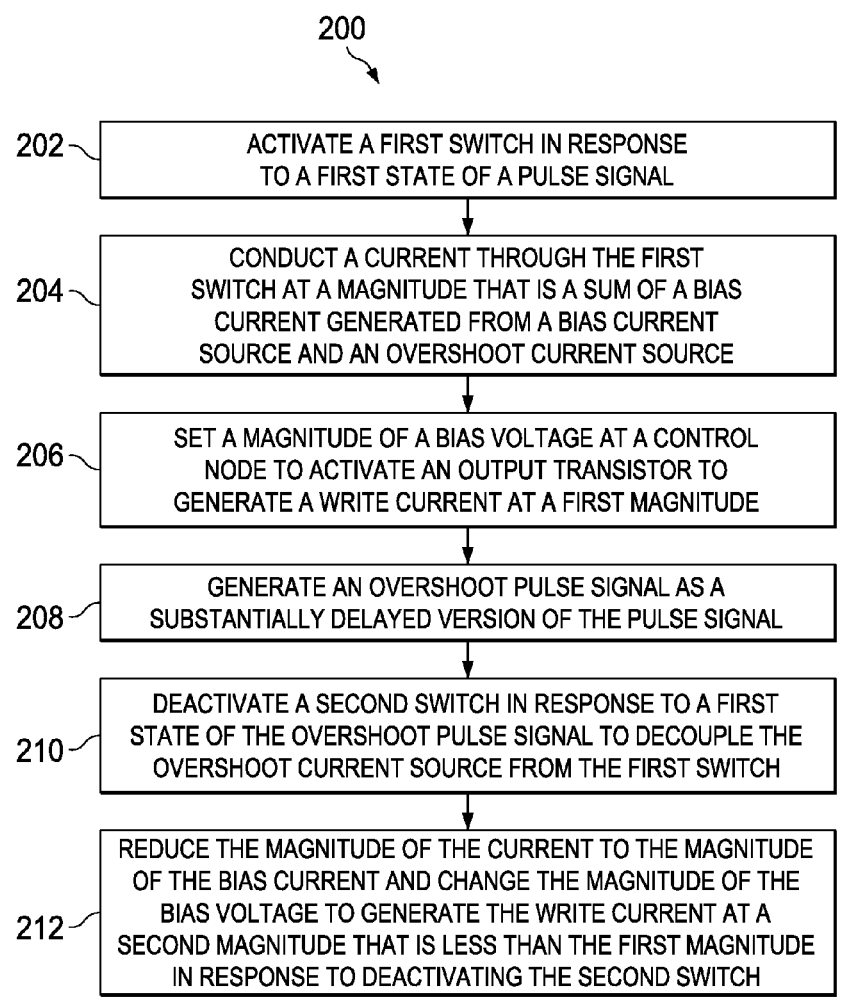
FIG. 5 illustrates an example of a method for writing data on a magnetic disk in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for writing data on a magnetic disk in accordance with an aspect of the invention. At 202, a first switch is activated in response to a first state of a pulse signal. The pulse signal can be generated from a pulse generator and can correspond to a data stream that is to be written onto the magnetic disk. At 204, a current is conducted through the first switch at a magnitude that is a sum of a bias current generated from a bias current source and an overshoot current generated from an overshoot current source. The bias current and the overshoot current can be sourced from a positive rail voltage or can be sinked to a negative rail voltage. The inclusion of both the bias current and the overshoot current can be during an overshoot phase to quickly reverse a magnetic field generated by a write current through a write head.

At 206, a magnitude of a bias voltage is set at a control node to activate an output transistor associated with the control node to generate a write current at a first magnitude. The first magnitude can be substantially high so as to reverse the magnetic field for writing an opposite binary state bit to the magnetic disk. The output transistor can be one of two concurrently activated output transistors to conduct the current through the write head, one to source the write current and one to sink the write current. At 208, an overshoot pulse signal is generated as a substantially delayed version of the pulse signal. The amount of delay between the pulse signal and the overshoot pulse signal can define the overshoot phase.

At 210, a second switch is deactivated in response to a first state of the overshoot pulse signal to decouple the overshoot current source from the first switch. Another switch can be concurrently activated to conduct the overshoot current between the overshoot current source and an intermediate voltage node, such as ground. At 212, the magnitude of the current is reduced to the magnitude of the bias current and the magnitude of the bias voltage changes to generate the write current at a second magnitude that is less than the first magnitude in response to deactivating the second switch. The magnitude of the write current can be absolute, such that the decrease can also apply to a negative current flow through the write head for opposite binary states of the data written to the magnetic disk. The method 200 can be repeated for transitions to an opposite binary state of data that is to be written to the magnetic disk, such as based on a second state of the pulse signal.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A system for writing data onto a magnetic disk, the system comprising:
   an output driver configured to provide a first write current through a first output transistor in a first state and to provide a second write current through a second output transistor in a second state, the first and second write currents being provided to a disk write head to store opposing binary values, respectively, on the magnetic disk;
   a disk write predriver comprising a bias current generator that is configured to switch a first bias current between an intermediate voltage node in the second state and a first control node in the first state and to switch a second bias current between the intermediate voltage node in the first state and a second control node in the second state, the first and second bias currents being provided to set a bias voltage at the first and second control nodes to bias the first and second output transistors, respectively,
   wherein the bias current generator comprises a first switch that interconnects a first current source and the first control node, a second switch that interconnects the first current source and the intermediate voltage node, a third switch that interconnects a second current source and the second control node, and a fourth switch that interconnects the second current source and the intermediate voltage node, the first and second current sources being configured to generate the first and second bias currents, respectively, and
   wherein the first and second states correspond to first and second logic-states of a pulse signal, and wherein the first and fourth switches are activated substantially concurrently based on the first state of the pulse signal and the second and third switches are activated substantially concurrently based on the second state of the pulse signal.

2. The system of claim 1, wherein the bias current generator is interconnected between an overshoot current generator and the first and second control nodes such that, during an overshoot phase upon switching from the second state to the first state, the first switch conducts a composite current that is a sum of the first bias current and an overshoot current, and during an overshoot phase upon switching from the first state to the second state, the third switch conducts a composite current that is a sum of the second bias current and the overshoot current.

3. The system of claim 2, wherein the overshoot current generator is controlled by an overshoot pulse signal that is a delayed version of the pulse signal, the overshoot pulse signal having a first state corresponding to the first state of the pulse signal and a second state corresponding to the second state of the pulse signal, an overshoot phase being defined by a duration of the delay between the pulse signal and the overshoot pulse signal.

4. The system of claim 3, wherein the overshoot current generator comprises a fifth switch that interconnects a first overshoot current source and the first switch, a sixth switch that interconnects the first overshoot current source and the intermediate voltage node, a seventh switch that interconnects a second overshoot current source and the third switch, and an eighth switch that interconnects the second overshoot current source and the intermediate voltage node, the first and second overshoot current sources each being configured to generate the overshoot current.

5. The system of claim 4, wherein the sixth and seventh switches are activated substantially concurrently based on the first state of the overshoot pulse signal and the fifth and eighth switches are activated substantially concurrently based on the second state of the overshoot pulse signal.

* * * * *